UNITED STATES PATENT OFFICE.

ELIZA M. SEABURY, OF BROOKLYN, NEW YORK, ADMINISTRATRIX OF JACOB SEABURY, DECEASED.

IMPROVED COMPOSITION FOR PREPARING PAINTS.

Specification forming part of Letters Patent No. 39,204, dated July 7, 1863.

*To all whom it may concern:*

Be it known that JACOB SEABURY, deceased, of the city of Brooklyn, in the State of New York, did invent certain new and useful Improvements in the Manufacture of certain Pigments, which are hereby declared and ascertained as follows:

In this manufacture shade and intensity of color, as well as body, are given by the article known in the market as "Vermont clay," and the pigments are formed, according to shade, substantially as follows: For light burnt umber, mix with two thousand pounds of bone-black six barrels of burnt sienna, two barrels of Vermont clay, and two barrels of burnt umber. For the middle tint or shade of burnt umber, put but five barrels of burnt sienna to the quantity of articles above named. For the dark shade of burnt umber, mix three thousand pounds of bone-black with six barrels of burnt sienna, four barrels of burnt umber, and two barrels of Vermont clay. For raw umber, mix one barrel, by measure, of bone-black, four barrels of raw umber, two barrels of raw sienna, and two barrels of Vermont clay. For Vandyke brown, mix two thousand pounds of bone-black, two barrels of burnt sienna, and two barrels of Vermont clay. To these pigments, proportioned for various shades, and furnishing a pigment of excellent body and durability, I add for black: Mix five parts of bone-black, two parts of Prussian blue, and five parts water, all by measure. These various ingredients are all ground and carefully put together and well mixed, after which they are prepared for the market, either ground or in cakes dried.

Having thus fully described the invention or discovery of the said JACOB SEABURY, what I claim as his invention is—

The pigments herein described composed of a combination of the ingredients specified, as and for the purposes set forth.

ELIZA M. SEABURY,
*Administratrix of Jacob Seabury.*

Witnesses:
 JAS. W. FRASER,
 E. B. SMITH.